United States Patent
Kang et al.

(10) Patent No.: US 8,311,807 B2
(45) Date of Patent: Nov. 13, 2012

(54) PERIODICALLY EXTRACTING AND EVALUATING FREQUENCY OF OCCURRENCE DATA OF UNREGISTERED TERMS IN A DOCUMENT FOR UPDATING A DICTIONARY

(75) Inventors: Inho Kang, Yongin-si (KR); Jeongmi Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1352 days.

(21) Appl. No.: 11/269,712

(22) Filed: Nov. 9, 2005

(65) Prior Publication Data

US 2006/0100856 A1    May 11, 2006

(30) Foreign Application Priority Data

Nov. 9, 2004    (KR) .................. 10-2004-0090895

(51) Int. Cl.
  G06F 17/21    (2006.01)
  G06F 17/27    (2006.01)
(52) U.S. Cl. .................. 704/10; 704/1; 704/9
(58) Field of Classification Search .......... 704/10, 704/1, 9
See application file for complete search history.

(56) References Cited

U.S. PATENT DOCUMENTS

| | | | | |
|---|---|---|---|---|
| 4,831,653 | A * | 5/1989 | Katayama | 704/243 |
| 5,109,509 | A | 4/1992 | Katayama et al. | 395/600 |
| 5,819,265 | A * | 10/1998 | Ravin et al. | 707/5 |
| 6,012,053 | A * | 1/2000 | Pant et al. | 707/3 |
| 6,393,399 | B1 * | 5/2002 | Even | 704/257 |
| 6,505,151 | B1 * | 1/2003 | Chou et al. | 704/9 |
| 6,651,058 | B1 * | 11/2003 | Sundaresan et al. | 707/6 |
| 6,915,297 | B2 * | 7/2005 | Chou | 707/5 |
| 7,024,624 | B2 * | 4/2006 | Hintz | 715/205 |

(Continued)

FOREIGN PATENT DOCUMENTS

| | | |
|---|---|---|
| JP | 05-2900084 | 11/1993 |
| JP | 08-287074 | 11/1996 |
| JP | 8-287074 | 11/2006 |

OTHER PUBLICATIONS

Tamir et al. Mining the Web to Discover the Meanings of an Ambiguous Word. Proc. of the Third IEEE International Conference on Data Mining, 2003. pp. 1-4.*

(Continued)

*Primary Examiner* — Jesse Pullias
(74) *Attorney, Agent, or Firm* — Staas & Halsey LLP

(57) ABSTRACT

A method and apparatus for updating a dictionary, by which documents of interest of a user are extracted through a network and a dictionary is updated with individual names and coined words extracted from the web documents, are provided. The dictionary updating method includes: extracting a document of interest of a user in each predetermined extraction period from a predetermined server connected to a dictionary updating system through a network, and extracting candidate unregistered words existing in the extracted document according to predetermined unregistered word extraction rules; based on information on appearance frequencies of the candidate unregistered words retrieved from the document, extracting unregistered words among the candidate unregistered words and extracting candidate semantic classes of the unregistered word; with usage examples of the unregistered word obtained through a searching unit, according to a predetermined unregistered word verification method, verifying the unregistered word and determining the semantic class of the verified unregistered word; and updating the dictionary updating system with the verified unregistered word and the semantic class of the verified unregistered word.

34 Claims, 10 Drawing Sheets

U.S. PATENT DOCUMENTS

| | | | |
|---|---|---|---|
| 7,228,270 B2 * | 6/2007 | Aso | 704/10 |
| 7,421,386 B2 * | 9/2008 | Powell et al. | 704/10 |
| 2003/0191625 A1 * | 10/2003 | Gorin et al. | 704/1 |
| 2003/0233235 A1 * | 12/2003 | Park | 704/257 |
| 2005/0021324 A1 * | 1/2005 | Brants et al. | 704/9 |
| 2005/0251384 A1 * | 11/2005 | Yang | 704/10 |

OTHER PUBLICATIONS

Korean Office Action issued on Jun. 16, 2006 with respect to Korean Application No. 10-2004-0090895, which corresponds to the above-referenced application.

* cited by examiner

PERIODICALLY EXTRACTING AND EVALUATING FREQUENCY OF OCCURRENCE DATA OF UNREGISTERED TERMS IN A DOCUMENT FOR UPDATING A DICTIONARY

CROSS-REFERENCE TO RELATED APPLICATION

This application claims the benefit of Korean Patent Application No. 10-2004-0090895, filed on Nov. 9, 2004, in the Korean Intellectual Property Office, the disclosure of which is incorporated herein in its entirety by reference.

BACKGROUND OF THE INVENTION

1. Field of the Invention

The present invention relates to a dictionary updating method and apparatus, and more particularly, to a method and apparatus by which (web) documents of interest of a user are extracted through a network and individual names and coined words extracted from the web documents are updated in a dictionary.

2. Description of the Related Art

Culture industry, including movies, dramas, and songs, is rapidly growing and in line with the growth, new individual names or coined words such as movie names, drama names, and song names, are quickly being generated and disappearing.

In order to process unregistered words such as the individual names and coined words, the U.S. Pat. No. 5,109,509 disclosed a method for extracting an unregistered word through a natural language parser and processing the unregistered word by utilizing words similar to the extracted unregistered word.

Meanwhile, in order to process unregistered words such as the individual names and coined words, Japanese Patent No.1993-290084 disclosed a method for extracting an unregistered word through a natural language parser and processing the unregistered word by analogizing the original form of the extracted unregistered word.

Also in order to process unregistered words such as the individual names and coined words, Japanese Patent No. 1996-287074 disclosed a method for extracting an unregistered word through a natural language parser and processing the unregistered word by displaying the extracted unregistered word to a user so that the user directly inputs the meaning of the unregistered word manually.

In the conventional technologies, there are inconveniences that whenever a new individual name or a coined word is generated, a dictionary should be changed, or whenever an unregistered word is extracted, the user should directly input the semantic class of the unregistered word in a dictionary. In particular, the conventional technologies has a drawback that a new individual name formed with a combination of registered words, such as movie names, and TV program names in VOD or interactive TV services running on voice recognition.

SUMMARY OF THE INVENTION

Additional aspects and/or advantages of the invention will be set forth in part in the description which follows and, in part, will be apparent from the description, or may be learned by practice of the invention.

The present invention provides a method for extracting an unregistered word from a web document of interest of a user and automatically updating a dictionary.

The present invention also provides a method for extracting an unregistered word from a web document of interest of a user in a voice recognition system and updating a dictionary of the voice recognition system with the extracted unregistered word.

The present invention also provides an apparatus for extracting an unregistered word from a web document of interest of a user and automatically updating a dictionary.

The present invention also provides an apparatus for extracting an unregistered word from a web document of interest of a user in a voice recognition system and updating a dictionary of the voice recognition system with the extracted unregistered word.

According to an aspect of the present invention, there is provided a method for updating a dictionary including: extracting a web document of interest of a user in each predetermined extraction period from a predetermined web server connected to the dictionary updating system through a network, and extracting candidate unregistered words existing in the extracted web document according to predetermined unregistered word extraction rules; based on information on appearance frequencies of the candidate unregistered words retrieved from the web document, extracting unregistered words among the candidate unregistered words and extracting candidate semantic classes of the unregistered word; with usage examples of the unregistered word obtained through a web searching unit, according to a predetermined unregistered word verification method, verifying the unregistered word and determining the semantic class of the verified unregistered word; and updating the dictionary updating system with the verified unregistered word and the semantic class of the verified unregistered word.

According to another aspect of the present invention, there is provided a method for updating a dictionary of a voice recognition system including: extracting a web document of interest of a user in each predetermined extraction period from a predetermined web server connected to the voice recognition system through a network, and retrieving candidate unregistered words existing in the extracted web document according to predetermined unregistered word extraction rules; based on information on appearance frequencies of the candidate unregistered words retrieved from the web document, extracting unregistered words among the candidate unregistered words and extracting candidate semantic classes of the unregistered word; with usage examples of the unregistered word obtained through a web searching unit, according to a predetermined unregistered word verification method, verifying the unregistered word and determining the semantic class of the verified unregistered word; updating a first memory unit of the voice recognition system with the unregistered word and the semantic class of the unregistered word; re-registering in a second memory unit of the voice recognition system, a registered word among registered words registered in the first memory unit, based on the user's usage frequency of the registered word and the appearance frequency information in a web document of the registered word; and in order to recognize the registered word registered in the first memory unit and the second memory unit, modifying a voice recognition model and a natural language processing model.

According to still another aspect of the present invention, there is provided an apparatus for updating a dictionary including: a document extraction unit accessing a web server through a network and extracting a web document of interest of a user in each predetermined extraction period; an unregistered word extraction unit extracting candidate unregistered words existing in the extracted web document according to predetermined unregistered word extraction rules, and based on appearance frequency information of the candidate unregistered words in the web document, extracting unregistered words among the candidate unregistered words; an unregistered word verification unit verifying the unregistered words with usage examples of the unregistered words extracted through the web server, and determining the semantic classes of the verified unregistered words; a first memory unit storing the unregistered words and the semantic classes of the unregistered words; and a registration unit registering the unregistered words and the semantic classes of the unregistered words in a predetermined location of the memory unit.

According to yet still another aspect of the present invention, there is provided an apparatus for updating a dictionary of a voice recognition system including: a document extraction unit accessing a web server through a network and extracting a web document of interest of a user in each predetermined extraction period; an unregistered word extraction unit extracting candidate unregistered words existing in the extracted web document according to predetermined unregistered word extraction rules, and based on appearance frequency information of the candidate unregistered words in the web document, extracting unregistered words among the candidate unregistered words; an unregistered word verification unit verifying the unregistered words with usage examples of the unregistered words extracted through the web server, and allocating semantic information of the verified unregistered words; a memory unit storing the unregistered words and the semantic information of the unregistered words; a voice recognition control unit controlling a voice recognition model and a natural language processing model in order to reflect an unregistered word stored in the memory unit; and a registration unit registering the unregistered words and the semantic information of the unregistered words in a predetermined location of the memory unit.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
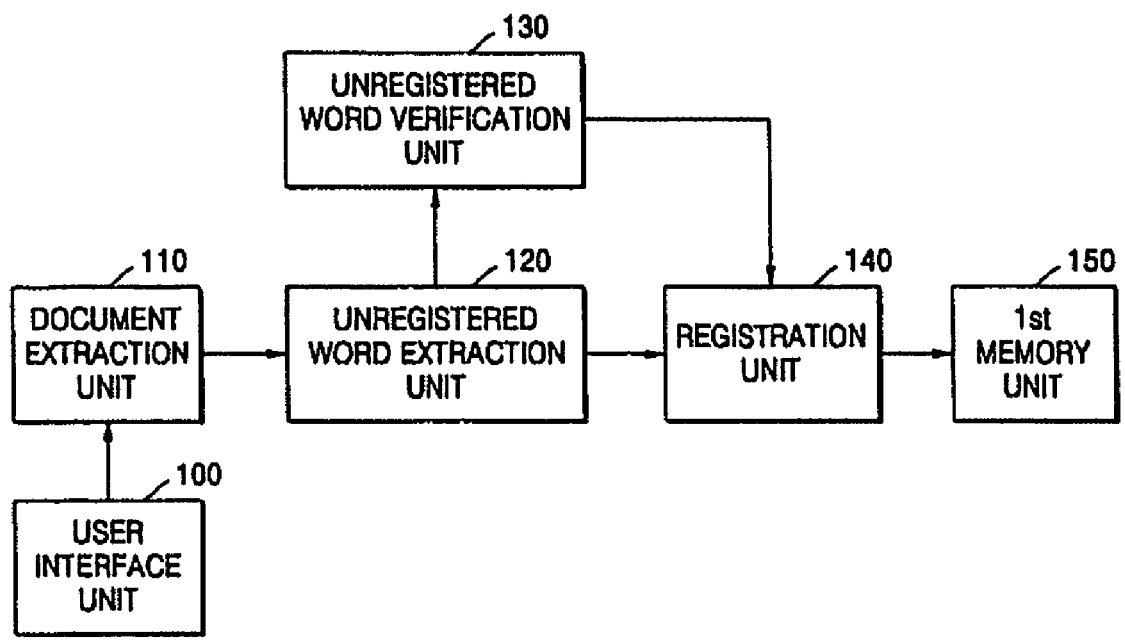
FIG. 1 is a functional block diagram of a dictionary updating apparatus according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Referring to FIG. 1, a dictionary updating apparatus according to an embodiment of the present invention includes a user interface unit 100, a document extraction unit 110, an unregistered word extraction unit 120, an unregistered word verification unit 130, a registration unit 140, and a first memory unit 150.

A user inputs a field of interest of the user and a website address corresponding to the field of interest of the user through the user interface unit 100. The web address corresponding to the field of interest of the user such as movies, TV programs, sports, and music, can be stored in the dictionary updating apparatus beforehand by a manufacturer or can be input directly by the user. It is also understood that a telephone number is also available as a predetermined address if network is a wireless network.

Figure 2:
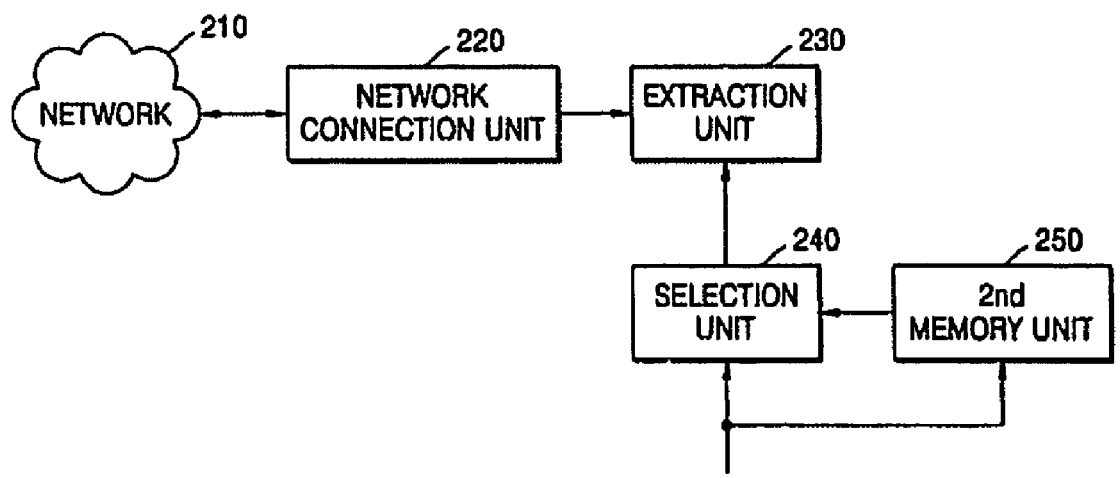
FIG. 2 is a detailed diagram of a document extraction unit of the dictionary updating apparatus shown in FIG. 1.

The document extraction unit 110 continuously extracts predetermined web documents in each predetermined extraction period through a network from the web address selected according to the field of interest of the user input. FIG. 2 is a detailed diagram of the document extraction unit 110.

Referring to FIG. 2, the document extraction unit 110 includes a network connection unit 220, an extraction unit 230, a selection unit 240, and a second memory unit 250. The dictionary updating apparatus is connected to the network 210 through the network connection unit 220, and accesses a web address corresponding to the field of interest of the user through the network 210. The web address corresponding to the field of interest of the user is stored in the second memory 250. The web address of the field of interest of the user can be directly input by the user or a web address of a predetermined field can be stored in the memory by the manufacturer. The selection unit 240 selects a web address stored in the second memory 250 according to the field of interest of the user input through the user interface unit 100. The extraction unit 230 accesses the web address selected by the selection unit 240 through the network connection unit 210 and extracts web documents in the field of interest of the user.

Figure 3:
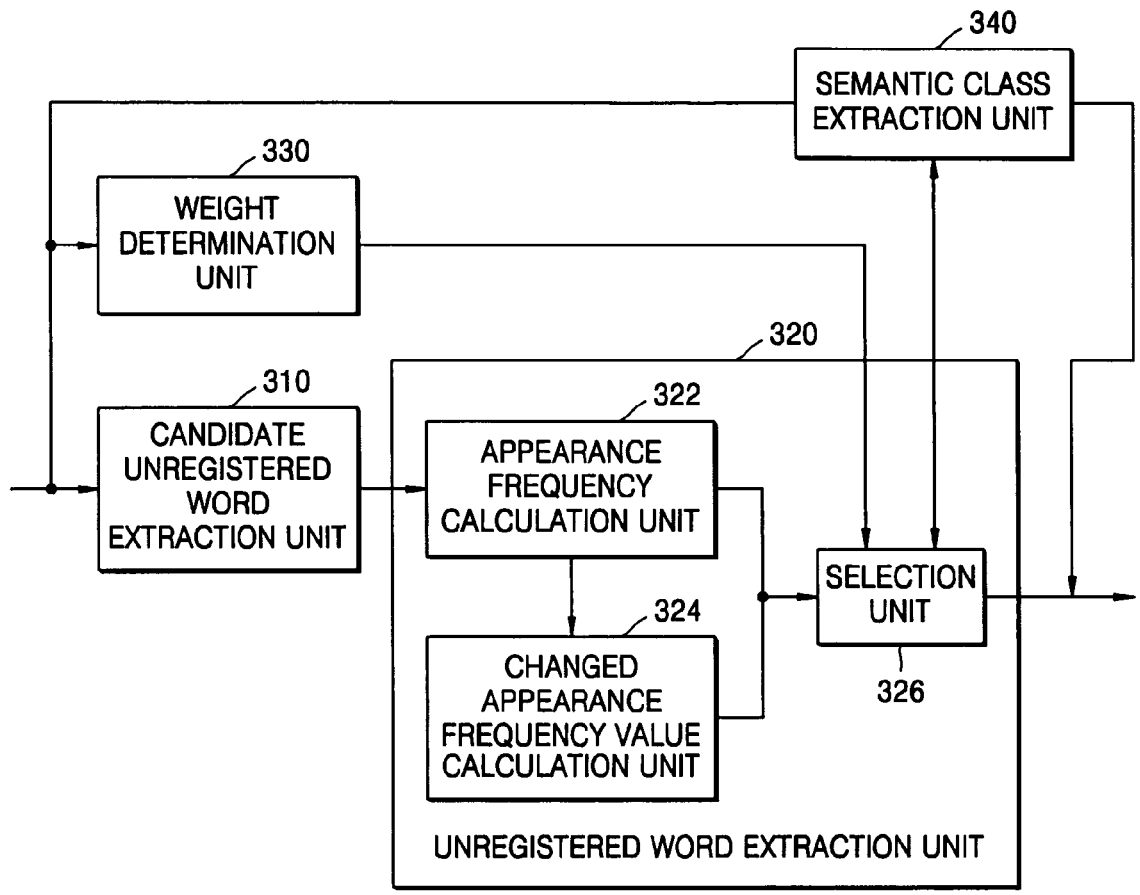
FIG. 3 is a detailed diagram of an unregistered word extraction unit of the dictionary updating apparatus shown in FIG. 1.

Referring to FIG. 1 again, the unregistered word extraction unit 120 extracts a candidate unregistered word existing in the web documents according to a predetermined unregistered word extraction method, and extracts unregistered words among the candidate unregistered words based on appearance frequency information of the candidate unregistered words in the web documents. Then, candidate semantic classes of the extracted unregistered word is extracted based on the extracted web documents. FIG. 3 is a detailed diagram of the unregistered word extraction unit 120 of the dictionary updating apparatus shown in FIG. 1.

Referring to FIG. 3, the unregistered word extraction unit 120 includes a candidate unregistered word extraction unit 310, an unregistered word selection unit 320, a weight determination unit 330, and a semantic class extraction unit 340. The candidate unregistered word extraction unit 310 extracts a candidate unregistered word existing in the extracted web documents from the document extraction unit 110, according to a predetermined unregistered word extraction rule. Unregistered word existed in the web documents includes coined words and individual names, and the coined words are extracted through a natural language parser and the individual names are extracted according to an individual name extracted method described in a regular expression form. Here, the coined word indicates a word not registered in the dictionary updating apparatus, and the individual name indicates a movie name, a song name, or a TV program name formed as a combination of words or coined words registered in the dictionary updating apparatus.

According to the individual name extraction method, a combination of words expressed by parentheses, quotation marks, brackets, a bold letter attribute, and an underline, can be extracted as an individual name, or a combination of pre-determined words expressed with a job name and a group name can be extracted as an individual name. Then, a regular expression corresponding to the individual name extraction method is generated, and if an expression corresponding to the generated regular expression is retrieved in the web document, the retrieved unregistered word is extracted as an individual name.

For example, if an individual name extraction method for "extracting a combination of words in quotation marks or parentheses" is expressed as a regular expression form, it becomes \"(.+)\", or \((.+)\). Meanwhile, if an individual name extraction method for "extracting a combination of words expressed with a job name or a job position" is extracted as an individual name" is expressed as a regular expression form, it becomes (singer | actor | baseball player | writer)(.+). The unregistered word extraction method is just an embodiment according to the present invention, and a different type of candidate unregistered word extraction method can be used with respect to the field to which the present invention is applied.

The unregistered word selection unit 320 includes an appearance frequency calculation unit 322, a changed appearance frequency value calculation unit 324, and a selection unit 326. The appearance frequency calculation unit 322 calculates the appearance frequency of the candidate unregistered word in the web documents during the extraction period. The appearance frequency of the candidate unregistered word (wj) is calculated according to the following equation 1:

$$P(w_j) = \frac{C(w_j)}{\sum_i C(w_i)} \quad (1)$$

Here, $C(w_i)$ denotes the appearance frequency of a word $(w_i)$ in the entire document.

The changed appearance frequency value calculation unit 324 calculates the changed value of the appearance frequency of the unregistered word in each extraction period according to the following equation 2:

$$\frac{P_t(w_j)}{P_{t-1}(w_j)} \quad (2)$$

Here, $P_t(w_j)$ denotes the appearance frequency of the unregistered word $(w_j)$ calculated during t extraction period.

Meanwhile, the selection unit 326 extracts a candidate unregistered word having an appearance frequency equal to or greater than a first threshold (TH1) and a changed appearance frequency value equal to or greater than a second threshold (TH2) among the candidate unregistered words, as an unregistered word.

The selection unit 326 can use a weight determined in the weight determination unit 330 in order to select an unregistered word among the candidate unregistered words.

The weight determination unit 330 determines the weights of the candidate unregistered words with respect to the type of the web document. For example, a candidate unregistered word extracted from a table such as a TV program timetable has a high weight, and a candidate unregistered word extracted from the field of interest of the user and related news has a medium weight, and a candidate unregistered word extracted from a general document has a lowest weight. The selection unit 326 can select an unregistered word by using a weighted appearance frequency generated by multiplying the weight of the candidate unregistered word determined in the weight determination unit 330 by the appearance frequency.

The semantic class extraction unit 340 extracts candidate semantic classes indicating which type of unregistered word the unregistered word selected in the web document extracted by the document extraction unit 110.

Figure 4:
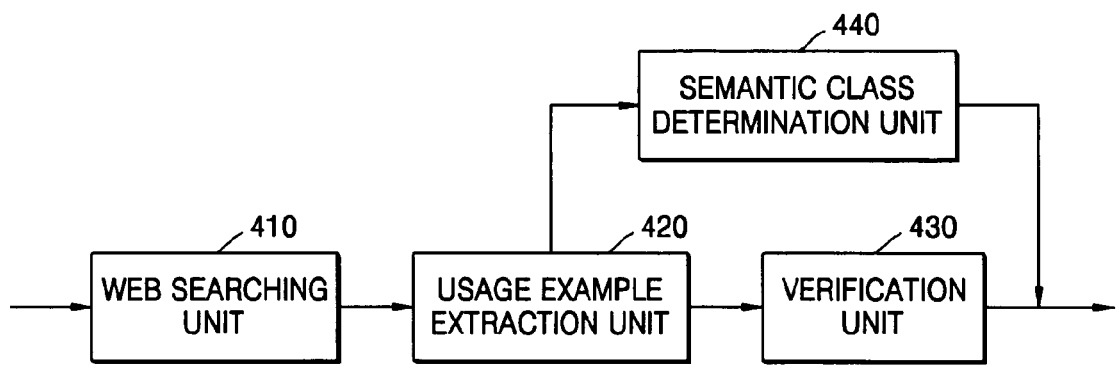
FIG. 4 is a detailed diagram of an unregistered word verification unit of the dictionary updating apparatus shown in FIG. 1.

Referring again to FIG. 1, the unregistered word verification unit 130 verifies the unregistered word from usage examples of the unregistered word extracted through the web server, and determines a semantic class of the verified unregistered word. Referring to FIG. 4, the unregistered word verification unit 130 according to an embodiment of the present invention will now be explained in more detail. It is also understood that a wireless server can be available as a server.

The unregistered word verification unit 130 includes a web searching unit 410, a usage example extraction unit 420, a verification unit 430, and a semantic class determination unit 440.

The web searching unit 410 performs web search for the extracted unregistered word, and extracts the web search result on the unregistered word. The usage example extraction unit 420 extracts a usage example of the unregistered word from the web search result, and the verification unit 430 verifies the unregistered word from the extracted usage example according to a predetermined unregistered word verification method.

For example, in order to verify the unregistered word, it is verified from the usage example whether there is a usage example of the unregistered word expressed by any one of parentheses, quotation marks, brackets, a bold letter attribute, and an underline.

Also, if the unregistered word is an individual name, it is verified from the usage example of the unregistered word whether the ratios of the frequency values of each word forming the individual name to the frequency value of the individual name is equal to or greater than a predetermined 3rd threshold (TH3).

The unregistered word verification method is an embodiment of the present invention and another unregistered word verification method can be used in a field to which the present invention is applied.

Meanwhile, the semantic class determination unit 440 determines the semantic class indicating the type of the unregistered word, from the usage example of the unregistered word.

From the frequency value appearing in a searching result extracted by inputting a search keyword formed with a combination of the unregistered word and each candidate semantic class of the unregistered word, the semantic class determination unit 440 determines the semantic class of the unregistered word.

Referring again to FIG. 1, based on the verification result of the unregistered word of the verification unit 130, the registration unit 140 registers the unregistered word and the semantic class of the unregistered word in a predetermined location of the first memory unit 150.

Figure 5:
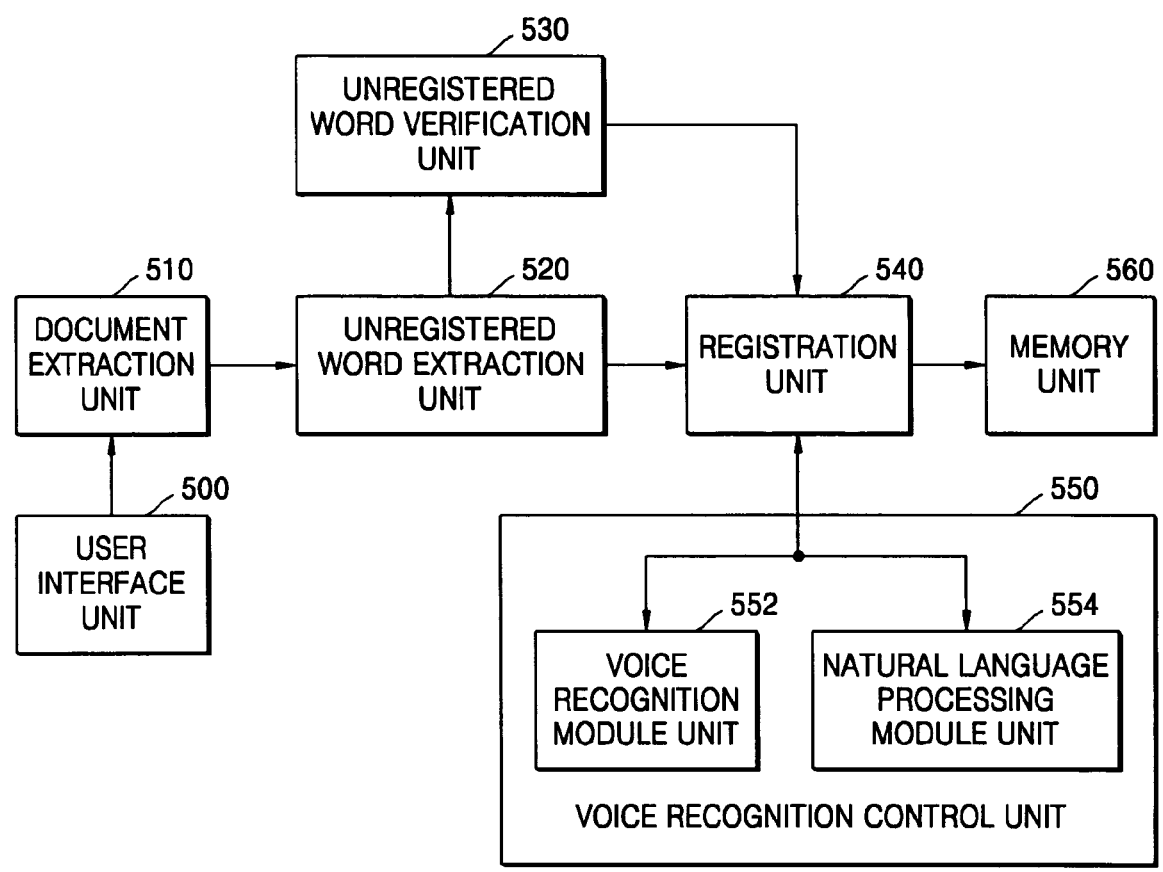
FIG. 5 is a functional block diagram of an apparatus for updating a dictionary of a voice recognition system with an unregistered word not registered in the dictionary of the voice recognition system according to an embodiment of the present invention.

FIG. 5 is a functional block diagram of an apparatus for updating a dictionary of a voice recognition system with an unregistered word not registered in the dictionary of the voice recognition system according to an embodiment of the present invention. Referring to FIG. 5, the dictionary updating apparatus for a voice recognition system includes a user interface unit 500, a document extraction unit 510, an unregistered word extraction unit 520, an unregistered word verification unit 530, a registration unit 540, a voice recognition control unit 550, and a memory unit 560. The interface unit 500, the document extraction unit 510, the unregistered word extraction unit 520, the unregistered word verification unit 530, the registration unit 540, and the memory unit 560 operate in the same manner as the interface unit 100, the document extraction unit 110, the unregistered word extraction unit 120, the unregistered word verification unit 130, the registration unit 140, and the memory unit 150, respectively, explained with reference to FIG. 1.

The voice recognition control unit 550 controls a voice recognition model module unit 552 and a natural language processing model module unit 554 in order to reflect an unregistered word stored in the memory unit 560. In order to control a voice recognition model, the voice recognition control unit 550 modifies a voice recognition lexicon or N-gram information in order to reflect the vocabulary of a new morpheme registered in the memory unit 560. Meanwhile, in order to control a natural language processing model, syntactic analysis information and semantic information are modified in order to reflect new coined words and individual names registered in the memory unit 560.

Figure 6:
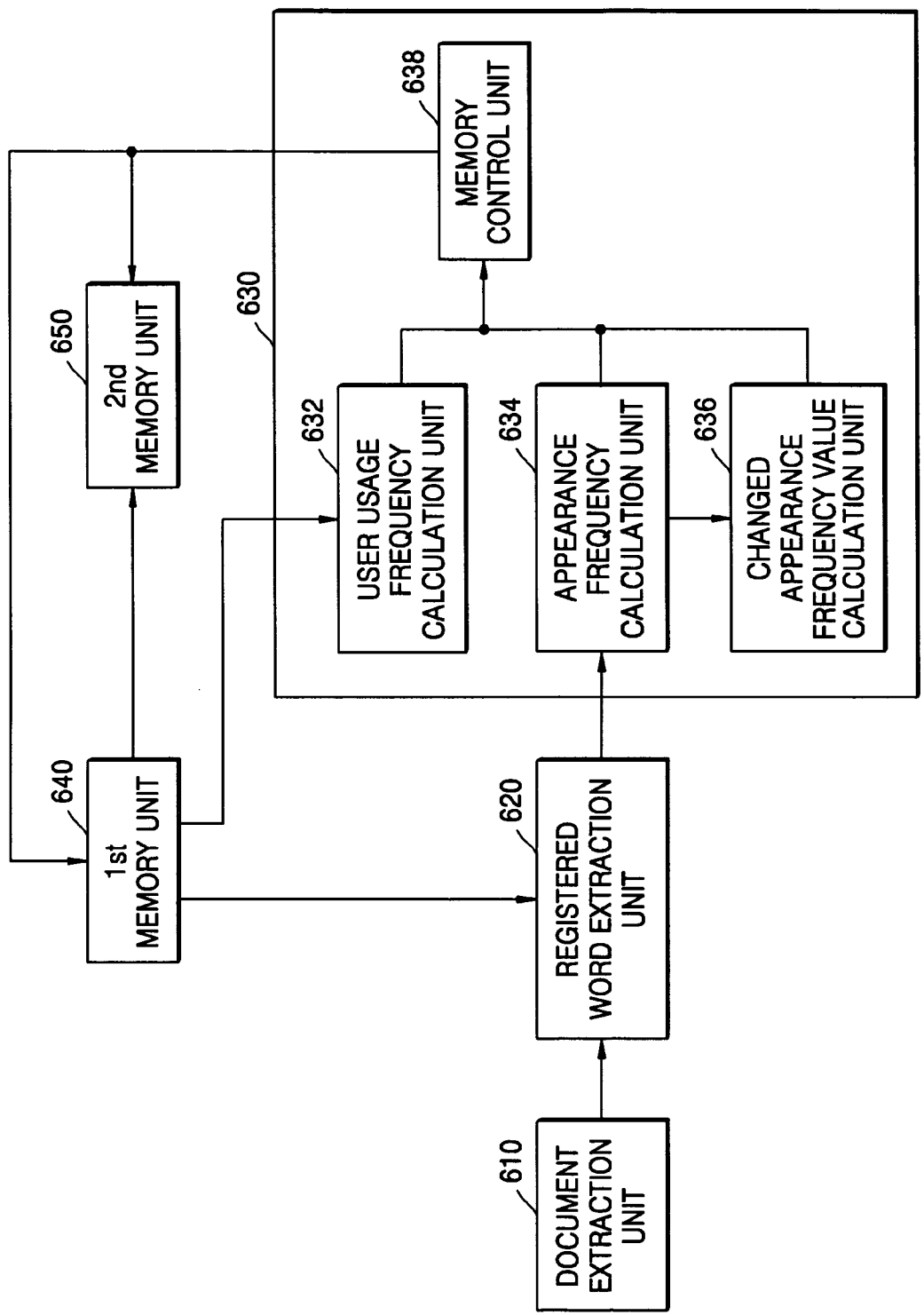
FIG. 6 is a functional block diagram of an apparatus for updating a registered word registered in a dictionary according to an embodiment of the present invention.

FIG. 6 is a functional block diagram of an apparatus for updating a dictionary according to an embodiment of the present invention. Referring to FIG. 6, the dictionary updating apparatus according to the present invention includes a document extraction unit 610, a registered word extraction unit 620, a control unit 630, a first memory unit 640, and a second memory unit 650. The document extraction unit 610 operates in the same manner as the document extraction unit 610 described above with reference to FIGS. 1 and 5. The registered word extraction unit 620 retrieves a registered word registered in the first memory unit 640, in each predetermined extraction period, from the web document of the field of interest of the user extracted in the document extraction unit 610.

The control unit 630 includes a user usage frequency calculation unit 632, an appearance frequency calculation unit 634, a changed appearance frequency value calculation unit 636, and a memory control unit 638. The user usage frequency calculation unit 632 calculates the usage frequency by the user of a registered word stored in the first memory unit 640, by counting the usage frequency of the registered word whenever the registered word is used by the user. The appearance frequency calculation unit 634 calculates the appearance frequency of the registered word in the web document through the registered word extraction unit 620, and the changed appearance frequency value calculation unit 636 calculates the changed appearance frequency value of the registered word in each extraction period. Meanwhile, the memory control unit 638 re-registers a registered word stored in the first memory unit 640, in the second memory unit 650, based on any one of the user usage frequency, the appearance frequency, and the changed appearance frequency value of the registered word. The memory control unit 638 senses the capacity of the second memory unit 650, and determines whether the capacity of the second memory unit is not enough to register the registered word of the first memory unit 640. If the capacity of the second memory unit 650 is not enough, a registered word with a lowest priority registered in the second memory unit 650 is deleted so that the registered word of the first memory unit 640 is registered in the second memory unit 650. It is understood that the first memory unit 640 and the second memory unit can be a memory unit. The priority of the registered word is determined by considering the user usage frequency, the appearance frequency, and the changed appearance frequency value. The smaller the user usage frequency, the appearance frequency, and the changed appearance frequency value are, the higher priority the registered word has, and the bigger the user usage frequency, the appearance frequency, and the changed appearance frequency value are, the lower priority the registered word has.

Figure 7:
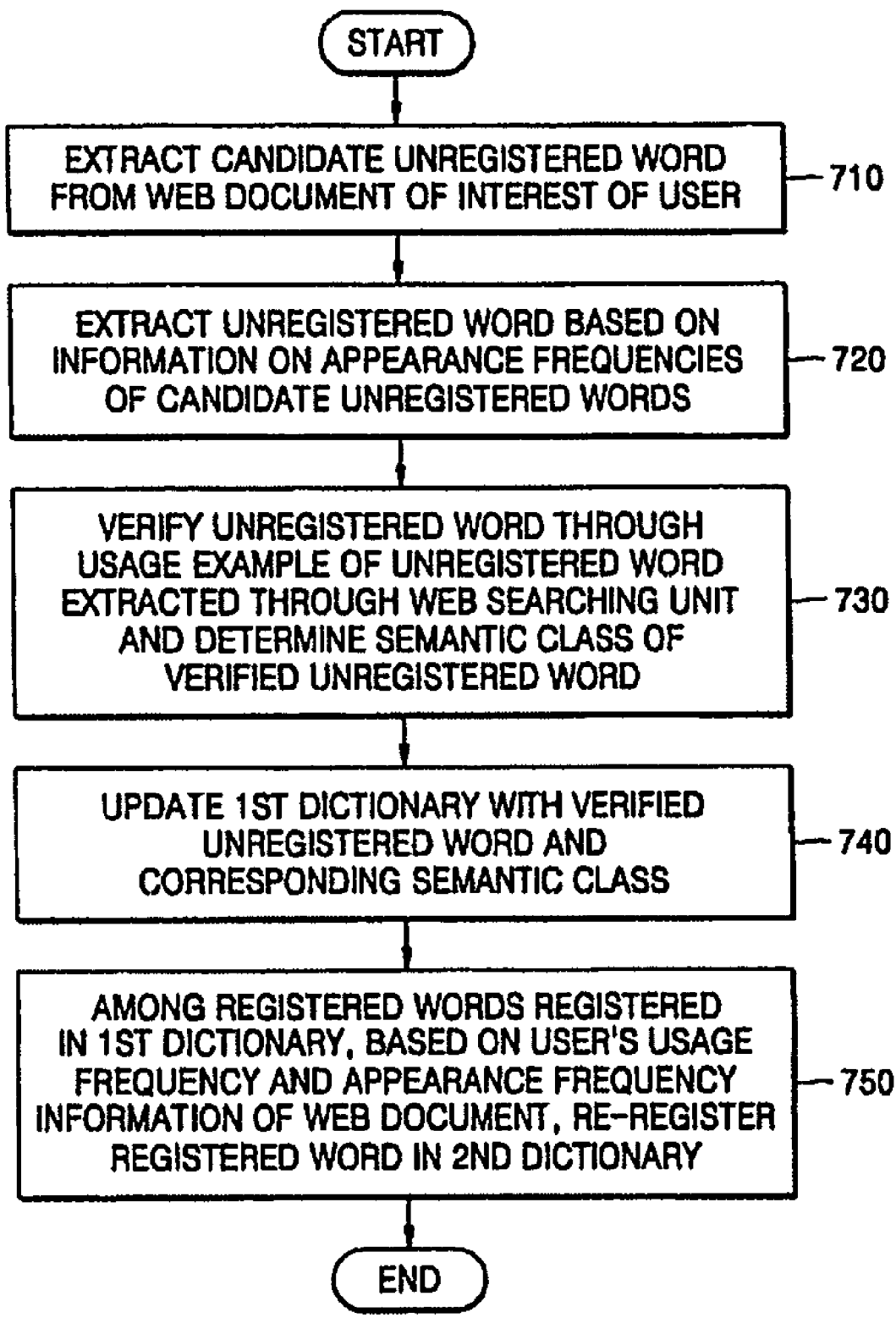
FIG. 7 is a flowchart of the operations performed by a method for updating a dictionary according to an embodiment of the present invention.
Figure 8:
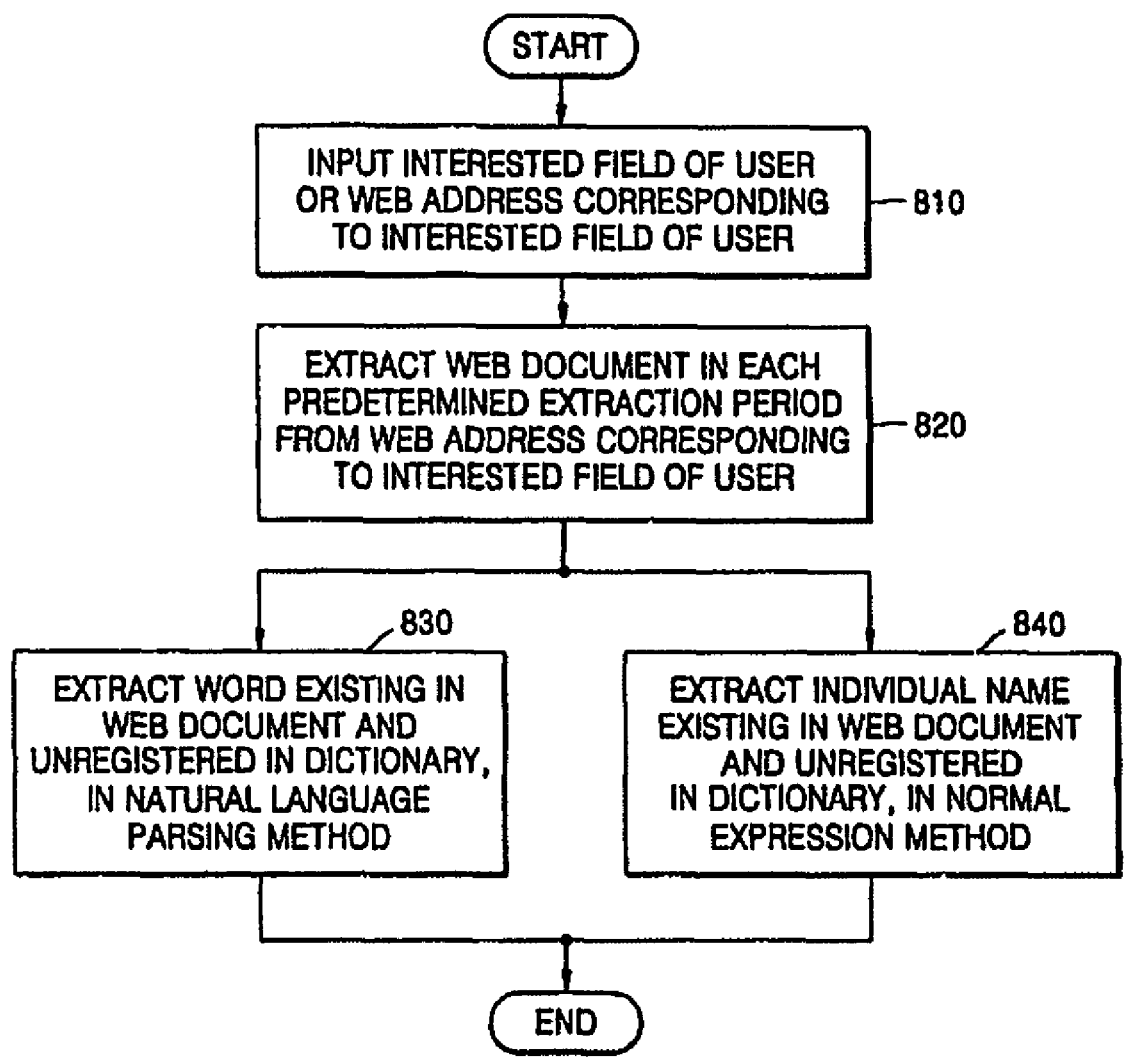
FIG. 8 is a detailed flowchart of an operation for extracting a candidate unregistered word from a web document in the method for updating a dictionary shown in FIG. 7.

FIG. 7 is a flowchart of the operations performed by a method for updating a dictionary according to an embodiment of the present invention. A web document of the field of interest of a user is extracted in each predetermined period from a predetermined web server through a network, and a candidate unregistered word existing in the extracted web document is extracted according to a predetermined unregistered word extraction rule in operation 710. FIG. 8 is a detailed flowchart of the operation 710.

Referring to FIG. 8, a field of interest of the user or a web address corresponding to the field of interest of the user is input in operation 810. If a field of interest of the user, such as a movie, a TV program, and a song, is input, the web address corresponding to the field of interest of the user is accessed through a network and a web document is extracted in each predetermined extraction period in operation 820. The web address corresponding to the field of interest of the user can be directly input by the user in operation 810 or can be input and stored by the manufacturer in advance. The web address is classified according to the field of interest of the user, and if a field of interest of the user is input, the classified web addresses are accessed. A word existing in the web document and not registered in the dictionary is extracted through a natural language parser in operation 830, and an individual name not registered in the dictionary is extracted according to an individual name extraction method generated in a predetermined regular expression form in operation 840. Accordingly, in the dictionary updating method according to the present invention, an individual name such as a movie name, and a song name formed as a combination of words, in addition to a coined word not registered in the dictionary is extracted as an unregistered word.

Figure 9:
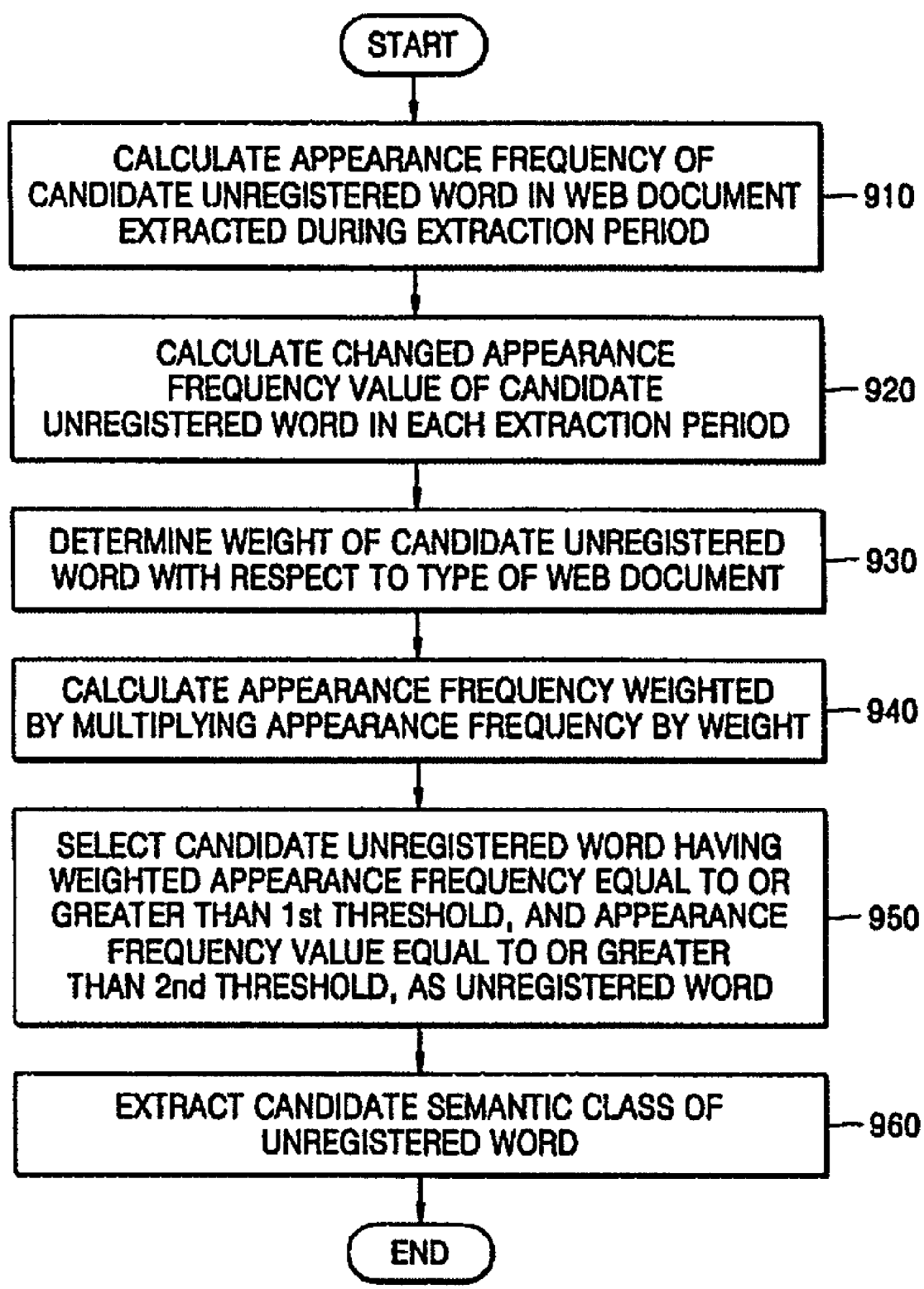
FIG. 9 is a detailed flowchart of an operation for extracting an unregistered word in the method for updating a dictionary shown in FIG. 7.

Referring again to FIG. 7, based on appearance frequency information of the candidate unregistered words extracted from the web document, an unregistered word is extracted among the candidate unregistered words, and candidate semantic classes of the unregistered word are extracted in operation 720. FIG. 9 is a detailed flowchart of the operation 720.

Referring to FIG. 9, during the extraction period, the appearance frequency of the extracted candidate unregistered word extracted in the web document is calculated in operation 910, and the changed appearance frequency value of a candidate unregistered word is calculated from the ratio value of the appearance frequency of the candidate unregistered word during a current extraction period, to the appearance frequency of the identical candidate unregistered word during the previous extraction period in operation 920. A candidate unregistered word having an appearance frequency equal to or greater than a predetermined first threshold (TH1) and a changed appearance frequency value equal to or greater than a predetermined second threshold (TH2) is selected as an unregistered word in operation 950. If an unregistered word is extracted among candidate unregistered words based on the appearance frequency information, a candidate semantic class indicating which type of unregistered word the unregistered word extracted from the extracted web document is extracted in operation 960.

Meanwhile, instead of the appearance frequency, by using a weighted appearance frequency with respect to the type of a web document, an unregistered word can be selected. That is, a higher weight is allocated to a candidate unregistered word extracted from a web document having a higher probability that a candidate unregistered word is selected as an unregistered word. In order to select an unregistered word by using a weighted appearance frequency with respect to the type of a web document, a weight of the candidate unregistered word is determined with respect to the type of the web document in operation 930, and a weighted appearance frequency generated by multiplying the appearance frequency by the weight is calculated in operation 940.

Figure 10:
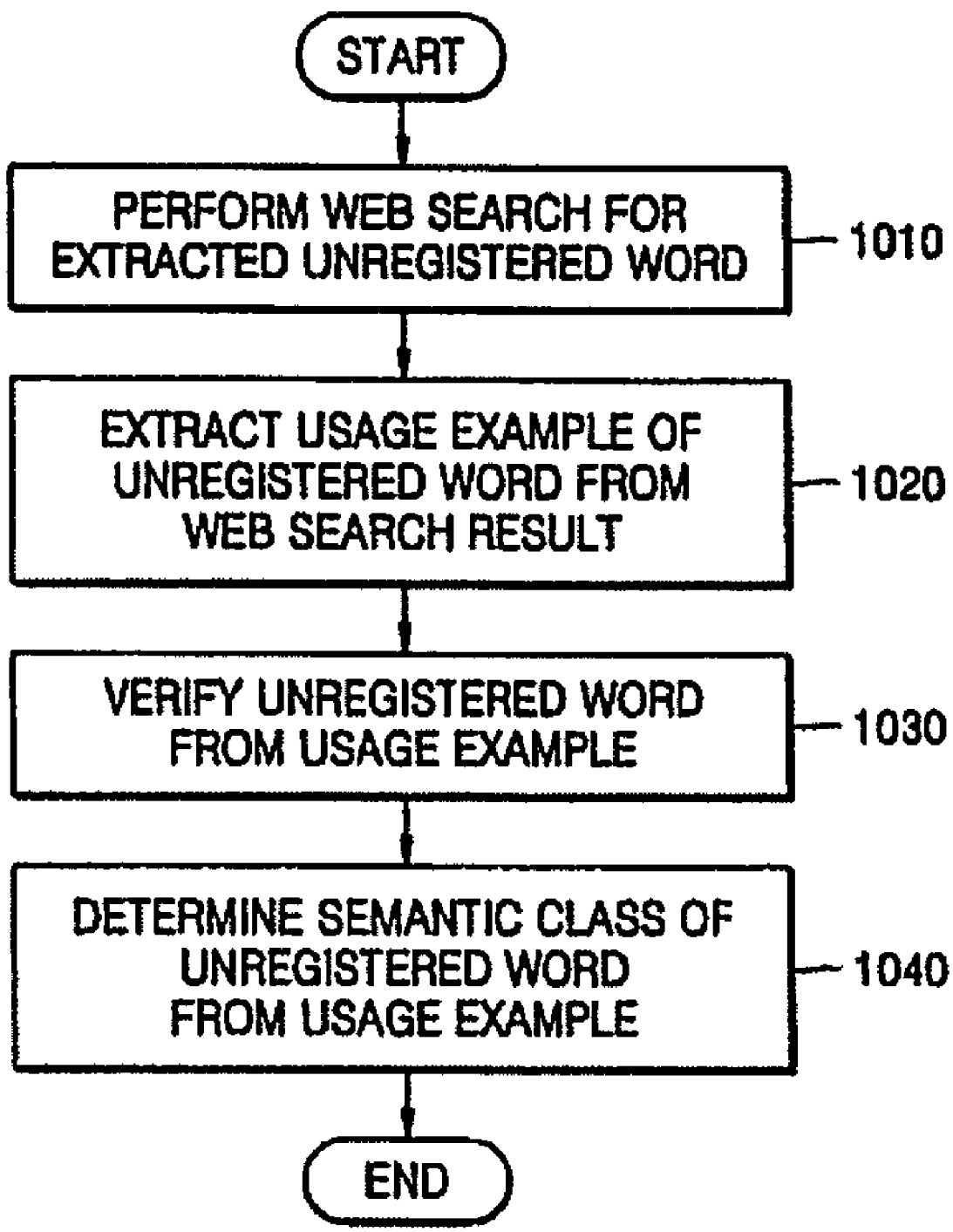
FIG. 10 is a detailed flowchart of an operation for verifying an unregistered word in the method for updating a dictionary shown in FIG. 7.

Referring again to FIG. 7, from the usage examples of the unregistered word obtained through a web searching unit, the unregistered word is verified according to a predetermined verification method, and the semantic class of the verified unregistered word is determined in operation 730. FIG. 10 is a detailed flowchart of the operation 730.

Referring to FIG. 10, the unregistered word extracted in operation 720 is input to a web searching unit and web searching for the unregistered word is performed in operation 1010, and from the web searching result for the unregistered word, usage examples of the unregistered word are extracted in operation 1020. With the usage examples of the unregistered word, according to the unregistered word verification method described above, the usage forms of the extracted unregistered word are analyzed and it is verified whether the extracted unregistered word is an unregistered word to be updated with in operation 1030. Meanwhile, from the usage examples of the unregistered word, the semantic class of the unregistered word is determined in operation 1040. If the usage examples show that the unregistered word has two or more semantic classes, the extracted candidate semantic classes are sequentially input to the web searching unit together with the unregistered word, and a semantic class having a highest appearance frequency in the web searching result is determined as the semantic class of the unregistered word.

Figure 11:
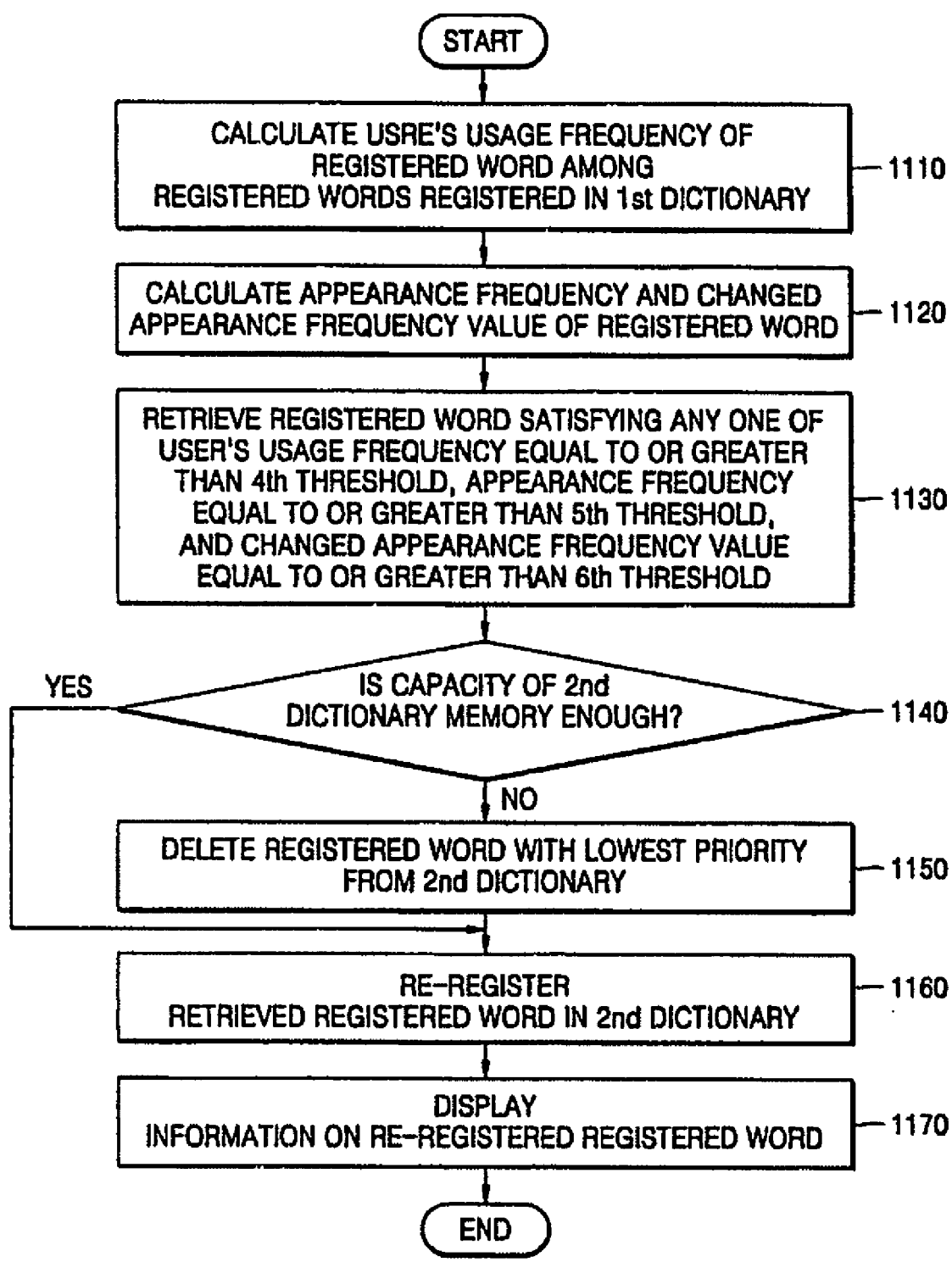
FIG. 11 is a flowchart of the operations performed by a dictionary updating method for re-registering a registered word registered in a first dictionary of a dictionary updating apparatus, in a second dictionary of the dictionary updating apparatus.

Referring again to FIG. 7, the unregistered word verified in the operation 730 and the semantic class of the unregistered word are updated in the first dictionary in operation 740. According to an embodiment of the present invention, among registered words registered in the first dictionary, based on user's usage frequency and appearance frequency information of a web document of a registered word, the registered word is re-registered in a second dictionary in operation 750. FIG. 11 is a detailed flowchart of the operation 750.

Referring to FIG. 11, the user's usage frequencies of registered words registered in the first dictionary are calculated in operation 1110. Unregistered words extracted from web document of the field of interest of the user are registered in the first dictionary, and whenever the registered words registered in the first dictionary are used by the user, the usage frequency of each registered word is counted. The appearance frequency of the registered word in the web document of the field of interest of the user extracted in each predetermined extraction period, and the changed appearance frequency value of the registered word in each extraction period are calculated in operation 1120. A search is performed to determine whether there is a registered word of the first dictionary satisfying any one of the user usage frequency equal to or greater than a predetermined fourth threshold (TH4), the appearance frequency equal to or greater than a predetermined fifth threshold (TH5), and the changed appearance frequency equal to or greater than a predetermined sixth threshold (TH6) in operation 1130. If a registered word satisfying the searching condition is retrieved, it is determined whether there is a room in the second dictionary for registered the retrieved registered word in operation 1140. If there is a room, the registered word of the first dictionary is re-registered in the second dictionary in operation 1160. Meanwhile, if there is no room in the second dictionary, among registered words registered in the second dictionary, a registered word with a lower priority having the lowest user's usage frequency, appearance frequency, and changed appearance frequency value is deleted in the second dictionary and the registered word is re-registered in the second dictionary in operation 1150. The registered word to be registered in the second dictionary is displayed to the user so that the user can know registered words frequently appearing recently in the field of interest of the user in operation 1170.

Figure 12:
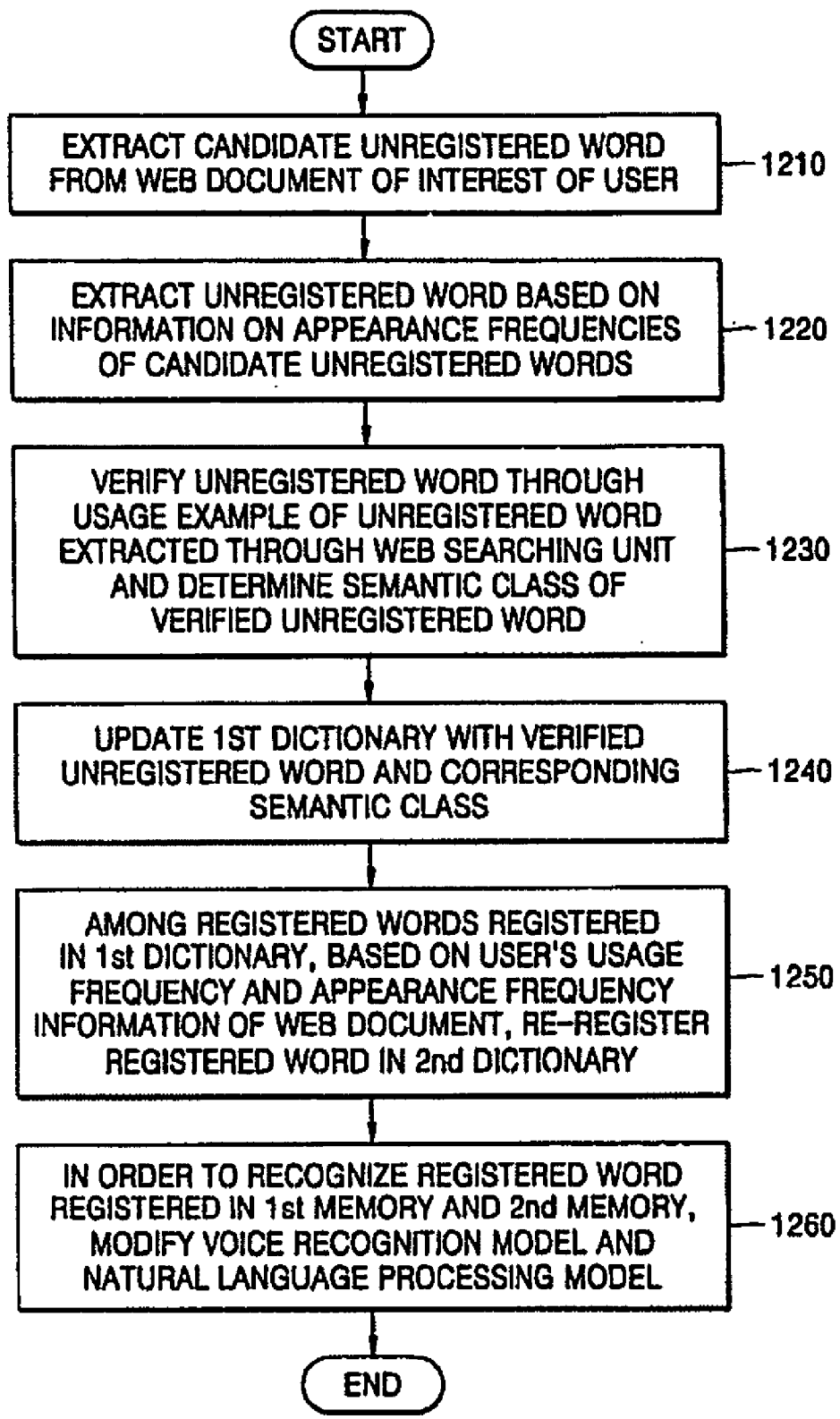
FIG. 12 is a flowchart of the operations performed by a method for updating a dictionary for a voice recognition system with an unregistered word not registered in the dictionary of the voice recognition system according to an embodiment of the present invention.

FIG. 12 is a flowchart of the operations performed by a method for updating a dictionary for a voice recognition system with an unregistered word not registered in the dictionary of the voice recognition system according to an embodiment of the present invention. Referring to FIG. 12, since operations 1210 through 1250 are identical to operations 710 through 750 of FIG. 7, the explanation will be omitted here. Meanwhile, in order to recognize a registered word registered in the first dictionary and the second dictionary in the voice recognition system, a voice recognition model and a natural language processing model of the voice recognition system are modified in operation 1260. In a dictionary updating method for voice recognition, a registered word having a higher user's usage frequency, appearance frequency, and changed appearance frequency value, is re-registered in the second dictionary, and by using the second dictionary first, a voice command of the user is recognized such that the voice command of the user can be recognized more accurately.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

According to the dictionary updating method of the present invention, web documents of the field of interest of the user are extracted in each predetermined extraction period such that an unregistered word existing in the web documents can be extracted according to the degree of the appearance frequency. Meanwhile, according to the dictionary updating method of the present invention, in addition to a coined word an unregistered word such as a movie name and a song name can also be extracted according to a predetermined extraction method, and the extracted unregistered word is verified by using a web searching unit such that an unregistered word can be extracted more accurately.

Also, according to the dictionary updating method of the present invention, a registered word having a higher user's usage frequency, appearance frequency, and changed appearance frequency value among registered words is re-registered in the second dictionary and in order to recognize a user's voice command, a registered word registered in the second dictionary is first retrieved such that the user voice command can be recognized more accurately.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method for updating a dictionary in a dictionary updating system with an unregistered word not registered in the dictionary, the method comprising:
    extracting a document of interest of a user in each predetermined extraction period from a predetermined server connected to the dictionary updating system through a network, and extracting candidate unregistered words existing in the extracted document according to predetermined unregistered word extraction rules;
    extracting unregistered words among the candidate unregistered words and extracting candidate semantic classes of the unregistered words based on information on appearance frequencies of the candidate unregistered words retrieved from the document;
    verifying the unregistered words according to a predetermined unregistered word verification method and determining semantic classes of the verified unregistered words with usage examples of the unregistered words obtained through a searching unit;
    updating a first dictionary of the dictionary updating system by registering all of the verified unregistered words and the semantic classes of the verified unregistered words; and
    re-registering, in a second dictionary of the dictionary updating system, registered words among registered words registered in the first dictionary, based on the user's usage frequency of the registered words and appearance frequency information in a document of the registered words,
    wherein registered words registered in the second dictionary are retrieved prior to registered words registered in only the first dictionary.

2. The method of claim 1, wherein the extracting of unregistered words among the candidate unregistered words and extracting of candidate semantic classes of the unregistered words comprises:
    calculating an appearance frequency of the candidate unregistered words in the document extracted during the extraction period;
    calculating a changed appearance frequency value of the candidate unregistered words in each extraction period;
    selecting a candidate unregistered word having an appearance frequency equal to or greater than a first threshold and a changed appearance frequency value equal to or greater than a second threshold, as an unregistered word; and
    extracting a candidate semantic class of the unregistered word from the document.

3. The method of claim 2, further comprising:
    determining a weight of the extracted candidate unregistered word with respect to a type of the document, wherein the appearance frequency is weighted by the weight.

4. The method of claim 3, wherein in determining the weight, a first weight, a second weight, and a third weight are allocated to candidate unregistered words retrieved from a table, a new article, and an ordinary document of the documents, respectively, and the first weight is greater than the second weight, and the second weight is greater than the third weight.

5. The method of claim 1, wherein the verifying of the unregistered words and the determining of the semantic classes of the verified unregistered words comprise:
    generating a search word for the unregistered words and performing a search through a searching unit;
    extracting usage examples of the unregistered words from the search for the search word;
    verifying the unregistered words with the usage examples according to a predetermined unregistered word verification method; and
    determining the semantic classes of the unregistered words among candidate semantic classes of the unregistered words according to the usage examples.

6. The method of claim 5, wherein according to the unregistered word verification method, an individual name having ratios of the frequency values of each word forming the individual name to the frequency value of the individual name in a usage example of an unregistered word, exceeding a threshold is verified as an unregistered word.

7. The method of claim 6, wherein the unregistered words are retrieved according to a predetermined natural language interpretation method, and the individual name is retrieved according to a regular expression method.

8. The method of claim 5, wherein according to the unregistered word verification method, it is verified whether the unregistered word is expressed by any one of parentheses, quotation marks, brackets, a bold letter attribute, and an underline.

9. The method of claim 1, further comprising:
    inputting a field of interest of a user and extracting a document from a web address corresponding to the field of interest of the user.

10. The method of claim 1, wherein the re-registering of the registered words comprises:
calculating the user's usage frequency of the registered words among registered words registered in the first dictionary;
calculating the appearance frequency in a document of the registered words among registered words registered in the first dictionary, and the changed appearance frequency value of the registered words in each extraction period;
retrieving a registered word satisfying at least one of the user's usage frequency equal to or greater than a first threshold, the appearance frequency equal to or greater than a second threshold, and the changed appearance frequency value equal to or greater than a third threshold; and
determining whether the retrieved registered word is registrable in the second dictionary and re-registering the retrieved registered word in the second dictionary.

11. The method of claim 10, wherein the re-registering of the retrieved registered word comprises:
determining whether there is a space for registering the retrieved registered word, in the second dictionary;
based on the determination result, deleting a registered word having a lowest priority based on the user's usage frequency, the appearance frequency, and the changed appearance frequency value of the registered word, among registered words registered in the second dictionary; and
re-registering the retrieved registered word in the second dictionary.

12. The method of claim 1, further comprising:
displaying information on the registered words re-registered in the second dictionary.

13. The method of claim 1, wherein the document is a web document.

14. The method of claim 1, wherein the server is web server.

15. A non-transitory computer readable recording medium having embodied thereon a computer program for the method of claim 1.

16. The method of claim 1, wherein a candidate unregistered word is an individual name formed with a word or a set of words not registered in the dictionary.

17. An apparatus for updating a dictionary comprising:
a document extraction unit to access a server through a network and extract a document of interest of a user in each predetermined extraction period;
an unregistered word extraction unit to extract candidate unregistered words existing in the extracted document according to predetermined unregistered word extraction rules, and based on appearance frequency information of the candidate unregistered words in the document, to extract unregistered words among the candidate unregistered words;
an unregistered word verification unit to verify the unregistered words with usage examples of the unregistered words extracted through the server, and to determine semantic classes of the verified unregistered words;
a first memory unit to store registered words by registering all of the verified unregistered words and the semantic classes of the unregistered words; and
a second memory unit to store registered words by re-registering registered words, among registered words registered in the first memory unit, based on the user's usage frequency of the registered words and appearance frequency information in a document of the registered words,
wherein registered words registered in the second memory unit are retrieved prior to registered words registered in only the first memory unit.

18. The apparatus of claim 17, wherein the document extraction unit further comprises:
a selection unit to select an address in the second memory unit corresponding to a field of interest of the user;
a network connection unit to connect the dictionary updating apparatus to the selected address of a network; and
an extraction unit to extract a predetermined document from the selected address.

19. The apparatus of claim 17, wherein the unregistered word extraction unit comprises:
a candidate unregistered word extraction unit to extract a candidate unregistered word existing in the extracted document according to a predetermined unregistered word extraction rule;
an unregistered word selection unit to select an unregistered word among candidate unregistered words, based on the appearance frequency information in the document of the candidate unregistered word; and
a semantic class extraction unit to extract a candidate semantic class of the selected unregistered word in the document.

20. The apparatus of claim 19, wherein the unregistered word selection unit further comprises:
an appearance frequency calculation unit to calculate the appearance frequency of the candidate unregistered word in the document extracted during the extraction period;
a changed appearance frequency value calculation unit to calculate the changed appearance frequency value of the candidate unregistered word in each extraction period;
a selection unit to select a candidate unregistered word having an appearance frequency equal to or greater than a first threshold and a changed appearance frequency value equal to or greater than a second threshold, as an unregistered word.

21. The apparatus of claim 20, wherein the unregistered word extraction unit further comprises:
a weight calculation unit to determine a weight of the extracted candidate unregistered word with respect to a type of the document, and the appearance frequency is weighted by the weight.

22. The apparatus of claim 21, wherein in determining the weight, a first weight, a second weight, and a third weight are allocated to candidate unregistered words retrieved from a table, a new article, and an ordinary document of the documents, respectively, and the first weight is greater than the second weight, and the second weight is greater than the third weight.

23. The apparatus of claim 17, wherein the unregistered word verification unit comprises:
a searching unit to search for an extracted unregistered word;
a usage example extraction unit to extract a usage example of the unregistered word from the search;
a verification unit to verify the unregistered word with the extracted usage example according to a predetermined unregistered word verification method; and
a semantic information determination unit to determine a semantic class of the unregistered word according to the usage example.

24. The apparatus of claim 23, wherein according to the unregistered word verification method, an individual name having a ratio of the frequency value of each word forming the individual name to the frequency value of the individual name in the usage example of the unregistered word, exceeding a third threshold is verified as an unregistered word.

25. The apparatus of claim 23, wherein according to the unregistered word verification method, it is verified whether the unregistered word is expressed by any one of parentheses, quotation marks, brackets, a bold letter attribute, and an underline.

26. The apparatus of claim 17, further comprising:
an user interface unit inputting a field of interest of a user or an address corresponding to the field of interest of the user.

27. The apparatus of claim 26, wherein the address is web address.

28. The apparatus of claim 17, wherein a candidate unregistered word is an individual name formed with a word or a set of words not registered in the dictionary.

29. A method for updating a dictionary of a voice recognition system providing a service corresponding to a voice command of a user, with an unregistered word not registered in the dictionary, the method comprising:
extracting a document of interest of a user in each predetermined extraction period from a predetermined server connected to the voice recognition system, and retrieving candidate unregistered words existing in the extracted document according to predetermined unregistered word extraction rules;
extracting unregistered words among the candidate unregistered words and extracting candidate semantic classes of the unregistered words based on information on appearance frequencies of the candidate unregistered words retrieved from the document; and
verifying the unregistered words according to a predetermined unregistered word verification method and determining the semantic classes of the verified unregistered words with usage examples of the unregistered words obtained through a searching unit;
updating a first dictionary of the voice recognition system by registering the unregistered words and the semantic classes of the unregistered words; and
re-registering, in a second dictionary of the dictionary updating system, registered words among registered words registered in the first dictionary, based on the user's usage frequency of the registered words and appearance frequency information in a document of the registered words,
wherein registered words registered in the second dictionary are retrieved prior to registered words registered in only the first dictionary.

30. The method of claim 29, further comprising:
modifying a voice recognition model and a natural language processing model.

31. The method of claim 29, wherein the document is a web document.

32. An apparatus for updating a registered word comprising:
a first memory unit and a second memory unit to store registered words;
a document extraction unit accessing a server through a network and extracting a document of a field of interest of a user in each predetermined extraction period;
a registered word extraction unit to extract a registered word stored in the first memory unit in the document extracted during the extraction period; and
a control unit to re-register in the second memory unit, a registered word stored in the first memory unit, based on at least one of the user's usage frequency of the registered word, the appearance frequency and the changed appearance frequency of the registered word in the document,
wherein registered words registered in the second memory unit are retrieved prior to registered words registered in only the first memory unit.

33. The apparatus of claim 32, wherein the control unit comprises:
a usage frequency calculation unit calculating the user's usage frequency of the registered word by counting the usage frequency of the registered word whenever the registered word stored in the first memory unit is used by the user;
an appearance frequency calculation unit calculating the appearance frequency of the registered word stored in the first memory, in the document through the registered word extraction unit;
a changed appearance frequency value calculation unit calculating the changed appearance frequency value of the registered word stored in the first memory unit from the appearance frequency of the registered word; and
a memory control unit re-registering in the second memory unit, a registered word stored in the first memory unit, based on at least one of the user's usage frequency, the appearance frequency, and the changed appearance frequency value of the registered word stored in the first memory unit.

34. An apparatus for updating a dictionary of a voice recognition system providing a service corresponding to a voice command of a user, with an unregistered word not registered in the dictionary, the apparatus comprising:
a document extraction unit accessing a server through a network and extracting a document of interest of a user in each predetermined extraction period;
an unregistered word extraction unit extracting candidate unregistered words existing in the extracted document according to predetermined unregistered word extraction rules, and based on appearance frequency information of the candidate unregistered words in the document, extracting unregistered words among the candidate unregistered words;
an unregistered word verification unit verifying the unregistered words with usage examples of the unregistered words extracted through the server, and allocating semantic information of the verified unregistered words;
a first memory unit to store, registered words by registering all of the verified unregistered words and the semantic classes of the unregistered words;
a second memory unit to store, registered words by re-registering registered words among registered words registered in the first memory unit, based on the user's usage frequency of the registered words and appearance frequency information in a document of the registered words; and
a voice recognition control unit controlling a voice recognition model and a natural language processing model in order to reflect unregistered words stored in the memory unit,
wherein registered words registered in the second memory unit are retrieved prior to registered words registered in only the first memory unit.

* * * * *